United States Patent
Schmidt

[19]

[11] Patent Number: 6,088,134
[45] Date of Patent: Jul. 11, 2000

[54] SWATH SCANNING SYSTEM USING AN OPTICAL IMAGER

[75] Inventor: Jack H. Schmidt, Carlsbad, Calif.

[73] Assignee: Hewlett-Packard Company, Palo Alto, Calif.

[21] Appl. No.: 08/665,777

[22] Filed: Jun. 17, 1996

[51] Int. Cl.[7] .............................. H04N 1/04; G01B 9/04; G02B 26/08; G02B 3/02

[52] U.S. Cl. ........................ 358/482; 358/482; 358/483; 250/208.01; 359/207; 359/708; 359/558

[58] Field of Search ................................... 358/482, 483; 250/208.01, 234, 208.1; 350/415, 463; 356/455; 359/207, 204, 206, 708, 558

[56] References Cited

U.S. PATENT DOCUMENTS

| | | | |
|---|---|---|---|
| 4,523,093 | 6/1985 | Neumann | 250/234 |
| 4,739,414 | 4/1988 | Pryor et al. | 358/265 |
| 4,929,066 | 5/1990 | Wakimoto et al. | 350/415 |
| 5,257,133 | 10/1993 | Chen . | |
| 5,671,080 | 9/1997 | Mihara | 358/482 |
| 5,822,073 | 10/1998 | Yee et al. | 356/445 |

FOREIGN PATENT DOCUMENTS

| 0559370A2 | 2/1993 | European Pat. Off. | H04N 1/18 |
|---|---|---|---|
| 2247090 | 2/1992 | United Kingdom | G02B 26/10 |

*Primary Examiner*—Edward L. Coles
*Assistant Examiner*—Twyler Lamb
*Attorney, Agent, or Firm*—Jerry R. Potts

[57] ABSTRACT

The invention is a system for scanning a document. A light source illuminates the document; an imager receives light from the document and directs it toward a detector array which produces a corresponding array of electrical signals. The imager has several optical properties that are useful either individually or in combination. The imager is telecentric and thereby ensures that image size and magnification are insensitive to object displacement along the optical axis and image brightness is uniform independent of object off-axis distance. An aspheric element within the imager balances focus variation within the depth of field with spherical aberration and thereby provides nearly uniform image resolution. A diffraction pattern, carried by the imager, corrects for spectral dispersion which occurs when light passes from air into a refractive material. An imager with a reflecting surface provides a system that is subject to little or no chromatic aberration. A solid imager with multiple internal reflecting surfaces in optical series, configured to include the previously mentioned optical properties, also provides for highly stable alignment of reflecting surfaces.

38 Claims, 8 Drawing Sheets

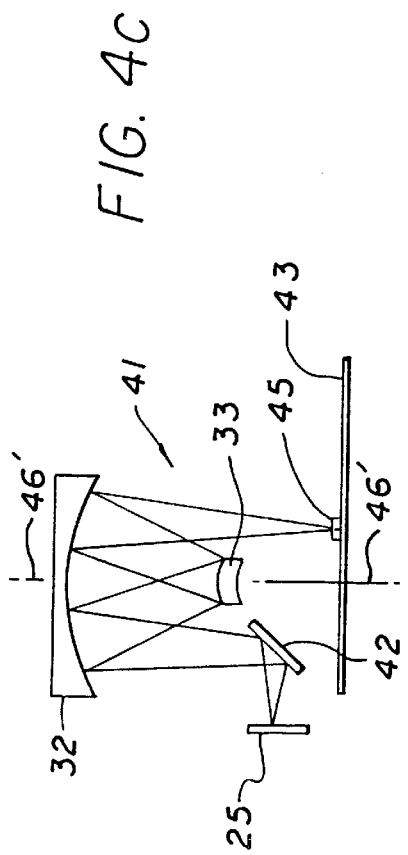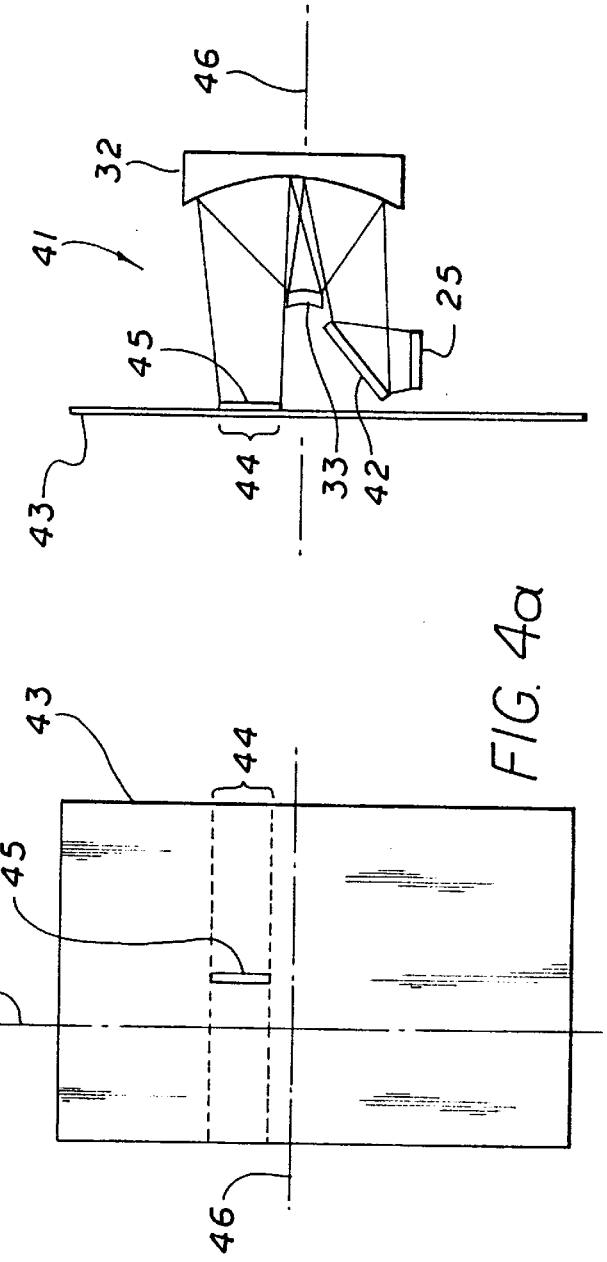

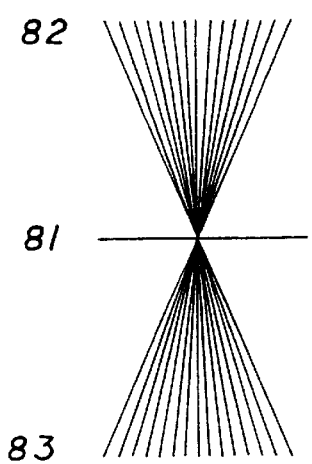
FIG. 8
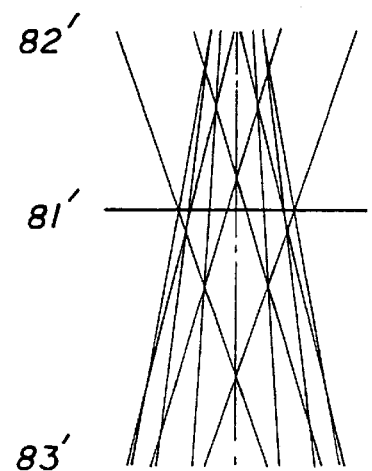
FIG. 9
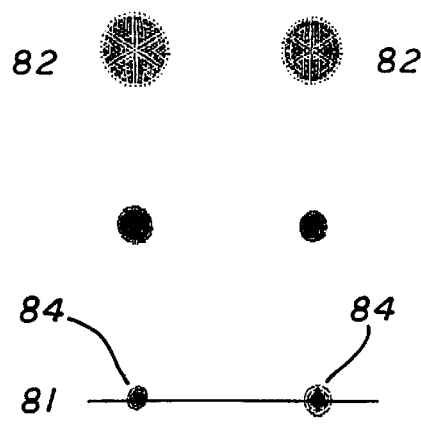
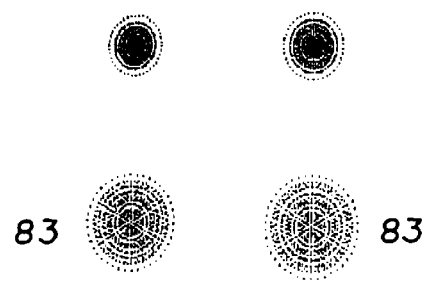
FIG. 10
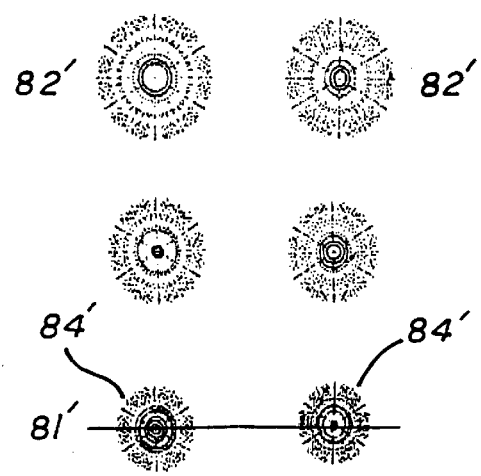
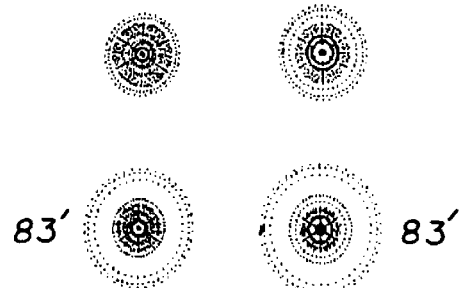
FIG. 11

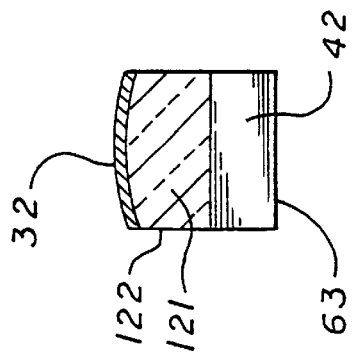
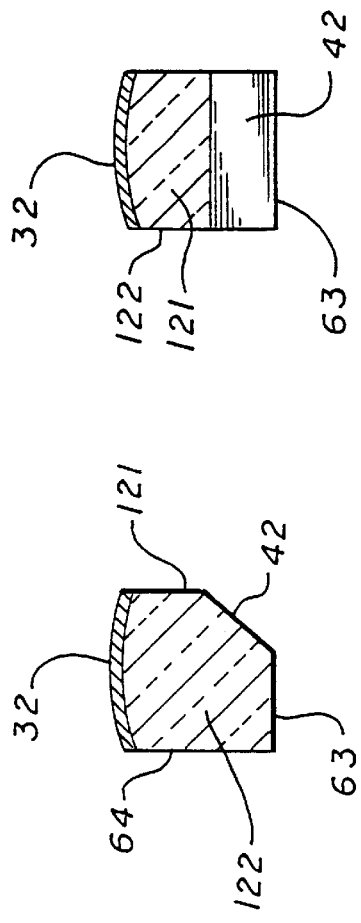
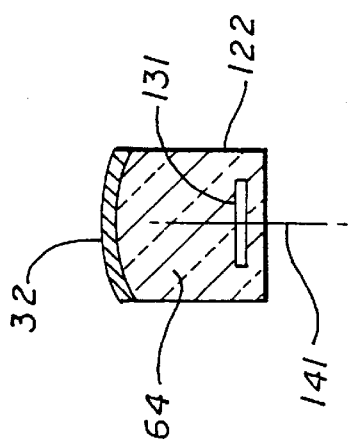
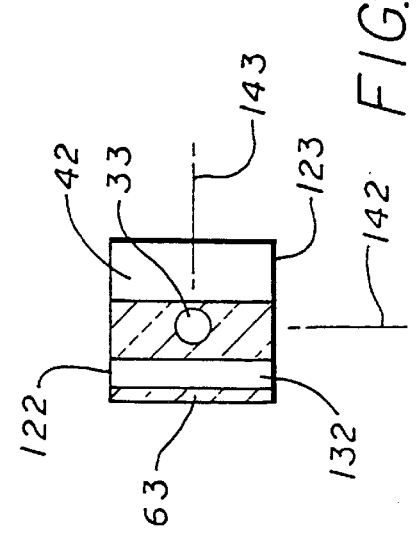
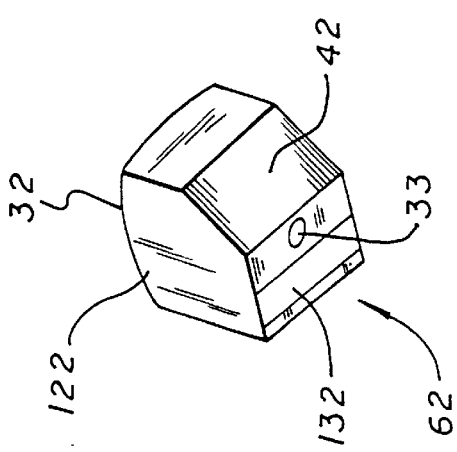

SWATH SCANNING SYSTEM USING AN OPTICAL IMAGER

FIELD OF THE INVENTION

This invention relates generally to systems for scanning documents, and more specifically to a system employing particular types of imagers for a swath scanning system.

Throughout this document the term imager refers to an optical device or system for receiving light from an object and directing light to an image. The phrase swath scanning system refers to a scanning system that serially acquires successive swaths of a document; such a system thus differs from a scanner that employs a linear detector array—fully extended across the document—to acquire entire pixel rows one at a time.

BACKGROUND OF THE INVENTION

In a pixel-based scanner, printer, copier, or fax machine, a swath consists of a number of pixel lines, modernly on the order of twenty to two hundred. In a swath scanning system the pixel columns within each swath are serially acquired, one pixel column at a time, by an imager and detector array which move together across the document on a carriage.

I call this type of operation "carriage scanning", "swath scanning", or "swath-type scanning"—and the devices "carriage scanners", "swath scanners", or "swath-type scanners". They are also sometimes called "moving scanners".

The ability of any scanning system to reproduce a document is largely dependent on the performance of its imager. The typical imager used in a document scanning system is purely refractive, aside from a planar folding mirror, and usually consists of a simple single lens or in some cases a compound lens system. Several optical characteristics useful in evaluating an imager's performance are set forth below.

(a) Focus and resolution—Imager focus varies as a function of object location, axially, within the imager's depth of field. A typical refractive imager has excellent focus near the center of the depth of field which decreases to merely acceptable focus behind and in front of that best-focus position, or in other words, near the ends of the depth of field.

Closely associated with focus is resolution. Resolution is a quantitative measure of an optical system's ability to produce a sharp image of an object. Imager resolution is affected by the quality of focus and, as will be seen, optical aberrations such as chromatic aberration. An imager with poor focus has poor or coarse resolution; an imager with good focus has good or fine resolution.

When points of an object are at different locations within a typical refractive imager's depth of field, i.e. at different axial positions, the object rays from points near the center of the depth of field are better focused in the resulting image than points farther from the center of the field. In scanning, variations in depth of field location arise when the document being scanned is wrinkled or misfed. The result is an image with varying focus—it is defocused at points where wrinkling has displaced the document from the best focal position.

Such a defect is particularly conspicuous when the document carries lines or edges angled very shallowly to the pixel grid so that serious aliasing occurs. Aliasing is smoothed out in areas that are defocused but appears plainly where the document is in sharp focus—an appearance that is both unpleasant and baffling to the casual user.

Therefore, it is disadvantageous to use a conventional scanner imager that produces images with variable resolution, dependent on axial displacement of the object within the imager's depth of field.

(b) Distortion—Distortion arises from variation of magnification due to (1) off-axis distance of an object point in a document, and (2) axial displacement of the document. A typical refractive imager is subject to significant distortion from both of these causes.

Variation of magnification with axial position arises because the primary ray from each object point is angled to the optical axis. Therefore fluttering or crumpling of a document, displacing any small region of the document in and out along the optical path, changes the off-axis distance of the intercept of the angled primary ray with the document surface. This change in off-axis distance amounts, for that region of the document, to variation in magnification—i.e., distortion.

It is thus disadvantageous to use a conventional scanner imager that produces images which are distorted when documents are wrinkled, dependent upon both off-axis distance and axial displacement of an object.

(c) Brightness—Image brightness varies as a function of object off-axis distance. A typical refractive imager collects more light from object points closer to the imager's optical axis than from points farther away from the axis.

The result is a swath image with a bright midregion and relatively dark extremes, producing a mottled or dirty effect. It is therefore disadvantageous to use a conventional scanner imager that collects light nonuniformly, dependent upon object off-axis distance.

(d) Chromatic aberration—In a typical refractive imager, chromatic aberration occurs when an object ray of white light refracts through the optical material of the imager. This refraction causes rays of various wavelengths to leave the material at different angles (spectral dispersion) and come into focus as points of different colors at different locations.

The result is a blurred image. The amount of blur is greater for object points farther from the optical axis because their rays enter the imager at its extremes, where refraction is typically greater—thus again creating a patchwork effect, or an overall impression of variable quality in finished copies. Accordingly, it is disadvantageous to use a conventional scanner imager with significant chromatic aberration.

(e) Banding—The above-discussed effects, in a swath scanner, both individually or collectively result in undesirable conspicuous banding. This occurs as follows.

Suppose an imager is called upon to scan a document composed of a series of closely spaced horizonal lines. Further suppose the imager has nonuniform brightness, chromatic aberration, and expansive distortion. Under these conditions each swath produced by the imager has dark, blurred, expansively spaced lines at the top and bottom of the swath, and bright, clear, narrowly spaced lines in the midregion of the swath.

Upon reassembly of the swaths a banding effect is apparent. The document image is a cyclic display of dark, blurred, expansively spaced groups of lines—alternating with bright, clear, narrowly spaced groups of lines.

The magnitude of these effects depends on the size of the swath. The bigger the swath, the farther points are from the imager's optical axis; accordingly, there is greater distortion at the extremes, greater disparity between the brightness of the swath center and the swath edge, and greater blur at the extremes.

(f) Inefficient light collection—An imager having inefficient light collection capability does not collect adequate light from the object. This results in an image with poor contrast.

In a scanning system, sufficient light must be collected from each pixel being scanned. This is particularly important in a swath scanning system because the rate at which each pixel is acquired is proportionately higher relative to a full transverse scanner. Therefore, it is disadvantageous to use a conventional scanner imager that cannot collect enough light from each pixel during the shorter exposure times needed for swath scanning.

(g) Related devices—As previously mentioned, a typical scanning system employs, as its imager, a single refractive lens or a compound lens system. A single lens does not possess the desired characteristics. The image quality of a single lens is strongly dependent on both off-axis distance and axial displacement of an object.

A complex, compound refractive lens system has some of the desired characteristics because it can correct for some off-axis distance effects such as distortion and chromatic aberration. This type of system, however, is moderately expensive and delicate. Considering the commercial and industrial environments in which these imagers must operate, it is disadvantageous to use an imager that is at once so costly and so touchy.

Besides the imager, other elements of a scanning system may compensate for poor imager performance. For example, the detector array may be calibrated to compensate for brightness variation. Compensation for inefficient light collection may be obtained by slowing down the scanning rate, thereby increasing exposure time, or by increasing the level of object illumination.

These solutions, while compensating for the inadequacies of the imager, create other problems. A calibrated detector array requires application of a weighting factor for each row in a swath, and a sizable calibration can use up some of the effective dynamic range—thereby degrading effective signal-to-noise ratio. Slower scanning speed results in a less efficient scanner, and greater illumination requires more operating power.

(h) Previously unrelated devices—Not previously associated with or suggested for use in scanners, are certain devices which have useful optical properties. Dating from Isaac Newton's astronomical telescope, it has been known to use nonrefracting, or reflecting, elements in imaging devices. Benefits of simple reflecting imagers include reduced chromatic aberration and increased light efficiency.

More modern imaging devices, such as the Dyson catadioptric imager and the Offner catoptric imager, have further useful optical properties. The Dyson imager has low distortion (near uniform magnification); however, it cannot correct for poor resolution due to axial displacement of an object within the imager's depth of field.

The original Offner imager, never suggested for use in a scanner, combines favorable features of reflecting imagers and the Dyson imager. It can accommodate axial displacement of an object in terms of magnification uniformity, but not in terms of resolution uniformity. In other words, the original Offner imager cannot produce an image with uniform resolution within its depth of field.

As previously stated, none of these imaging devices has been associated with, or suggested for use in, document scanning systems.

(i) Conclusion—Thus important aspects of the technology used in the field of the invention remain amenable to useful refinement.

SUMMARY OF THE DISCLOSURE

The present invention introduces such refinement. The present invention has several aspects or facets that can be used independently, although they are preferably employed together to optimize their benefits.

In all preferred embodiments, the invention is a system for scanning a document. This system includes means for illuminating a document.

It also has a detector array for receiving light and responding to the light by producing a corresponding array of electrical signals. Again, these mentioned features are common to all the aspects or facets of the invention.

Now, in preferred embodiments of a first facet or aspect, the scanning system further includes a telecentric imager for receiving light from the document and directing the light toward the detector array.

The foregoing may constitute a description or definition of the first facet of the invention in its broadest or most general form. Even in this general form, however, it can be seen that this aspect of the invention significantly mitigates the difficulties left unresolved in the art.

In particular the telecentric imager ensures that magnification and image size are insensitive to axial displacement of the object within the imager's depth of field, in other words, nearly distortion free. Telecentricity also inherently provides uniform light collection independent of object distance off the optical axis; the result is an image with uniform brightness.

In a second facet of the invention, the system has an optical axis and the document is subject to axial displacement. It also has an imager for receiving light from the document and directing the light toward the detector array.

The imager has an aspheric element for introducing spherical aberration to reduce variation of resolution as a function of axial displacement.

The foregoing may constitute a description or definition of the second aspect of the invention in its broadest or most general form. Even in this general form, however, it can be seen that this aspect of the invention significantly mitigates the difficulties left unresolved in the art.

In particular the aspheric element introduces spherical aberration into the imager to provide more uniform resolution independent of axial displacement of the object (due to a wrinkled or misfed document) within the imager's depth of field.

Although this aspect of the invention in its broad form thus represents a significant advancement in the art, it is preferably practiced in conjunction with certain other features or characteristics that further enhance enjoyment of overall benefits.

For example, it is preferred that the aspheric element be located at an aperture stop of the system. It is also desirable that the imager be telecentric.

It is further desirable that the imager include plural surfaces in optical series—and that one or more of the surfaces carry a diffraction pattern to correct spectral dispersion caused by refraction at one of the surfaces.

In preferred embodiments of a third facet or aspect, the system further includes an imager, having plural surfaces in optical series, for receiving light from the document and directing the light toward the detector array. It also has a diffraction pattern, carried by one or more of the surfaces, for correcting spectral dispersion caused by refraction at one of the surfaces.

The foregoing may constitute a description or definition of the third aspect of the invention in its broadest or most general form. Even in this general form, however, it can be seen that this aspect of the invention significantly mitigates the difficulties left unresolved in the art.

In particular the diffraction pattern corrects spectral dispersion which occurs when light passes from air into a refractive material. The diffraction pattern cancels the spectral dispersion by causing the light to disperse in a direction, equal but opposite, to the refractive dispersion, thereby greatly reducing image blur.

Although this aspect of the invention in its broad form thus represents a significant advancement in the art, it is preferably practiced in conjunction with certain other features or characteristics that further enhance enjoyment of overall benefits. For example, it is also desirable that the imager be telecentric.

As to preferred embodiments of a fourth facet or aspect, the system further includes a reflecting imager for receiving light from the document and directing the light toward the detector array. The imager is, for example, one that obtains optical power at a reflecting surface rather than through a lens—i.e., one whose focal elements are reflectors.

Although this aspect of the invention in its broad form thus represents a significant advance in the art because it provides a system that is subject to little or no chromatic aberration, as will be seen, it is preferably practiced in conjunction with certain other features or characteristics that further enhance enjoyment of overall benefits.

For example, it is preferred that the reflecting imager comprise plural mirrors aligned in optical series. It is also desirable that the plural mirrors comprise converging mirror means and a diverging mirror. The phase "mirror means" is meant to encompass a plurality of mirrors, as well as a single mirror.

A converging mirror is typically thought of as a concave mirror (or a positive mirror) that causes rays of light parallel to its axis to converge. A diverging mirror is typically thought of as a convex mirror (or a negative mirror) that causes rays of light parallel to its axis to diverge.

Throughout this document, regardless of the concave or convex appearance of a mirror, the terms converging and diverging will be used to describe the properties of a mirror. For example, it will be seen that in certain solid-optical-block embodiments the converging mirror is, when viewed from the exterior of the solid, convex in shape; however, when viewed from the interior of the solid it is concave. Therefore, to avoid confusion the terms concave and convex will be avoided.

It is further desirable that the diverging mirror be positioned to receive light from the converging mirror means and reflect the light back toward the converging mirror means. It is still further desirable to have a third mirror positioned in optical series with the converging mirror means to fold the optical path.

It is also preferred that the reflecting imager be a solid optical material having an internal reflective surface. The imager may also have plural internal reflecting surfaces in optical series.

It is also desirable that the solid optical material define internal converging mirror means and an internal diverging mirror. The previously introduced features concerning the position of the diverging mirror and the inclusion of a third mirror are also desirable in the solid-optical-material imager.

It is furthermore preferred that the optical axis of the diverging mirror be aligned with the optical axis of the converging mirror means.

It is also desirable that the diverging mirror be slightly aspheric for reducing variation of resolution, as previously mentioned. It is further desirable that the diverging mirror carry a diffraction pattern to compensate for chromatic aberration caused by refraction at the air/surface interface, also mentioned previously.

Additionally, it is preferred that the scanning system have means for translating the detector array and the imager together across the document to obtain a signal array representing a swath of the document.

As to preferred embodiments of a fifth aspect, the system further includes an imager made of a solid optical material that defines internal converging mirror means and an aspheric internal diverging mirror. The diverging mirror is positioned to receive light from the converging mirror means—and to reflect the light toward the converging mirror means.

The system still further includes a carriage for translating the detector array and imager together across the document to obtain a signal array representing a swath of the document.

This aspect of the invention in its broad form thus represents a significant advance in the art, because its solid configuration provides for highly stable alignment, a feature particularly beneficial to systems used in commercial or industrial settings, and its carriage provides a mechanism for moving the imager and detector array across the document, thereby enabling the use of compact inexpensive lighting, optics and detectors in acquiring a full-page image. Nevertheless it is preferably practiced in conjunction with certain other features or characteristics that further enhance enjoyment of overall benefits.

For example, it is preferred that the solid optical material further define a third internal mirror positioned to receive light from the converging mirror means and fold the light toward the detector array. It is also desirable that the carriage translate the illuminating means, and that the diverging mirror carry a diffraction pattern.

All of the foregoing operational principles and advantages of the present invention will be more fully appreciated upon consideration of the following detailed description, with reference to the appended drawings, of which:

BRIEF DESCRIPTION OF THE DRAWINGS

FIG. 4a is a plan of a document showing a swath and an instantaneous field of view;

FIGS. 4b and 4c are diagrams, in longitudinal section in a system plane of symmetry, very schematically showing imaging optical trains that fold the optical path and that generally speaking can be used in the FIGS. 1 and 2 embodiment—and in particular illustrating in FIG. 4b alignment of the system plane of symmetry with a desired field of view in an object, and in FIG. 4c perpendicularity of the same plane and field;

FIG. 8 is a longitudinal section of light rays along the optical axis in a system without spherical aberration, and showing strongly varying sharpness along the optical axis;

FIG. 9 is a like view of light rays along the optical axis in a system with added spherical aberration, and showing reduced variation of sharpness along the optical axis;

FIG. 10 is a cross-sectional ray-spot diagram corresponding to FIG. 8;

FIG. 11 is a like view but corresponding to FIG. 9;

FIG. 12a is an isometric or perspective representation of the imager of FIGS. 2 and 6b, taken from below right; and FIGS. 12b through 12e are orthographic views of the imager of FIG. 12a: FIG. 12b is a left elevation showing the exit face, FIG. 12c a front elevation, FIG. 12d a right elevation, and FIG. 12e a bottom plan showing the entry face.

DETAILED DESCRIPTION OF THE PREFERRED EMBODIMENTS

Figure 1:
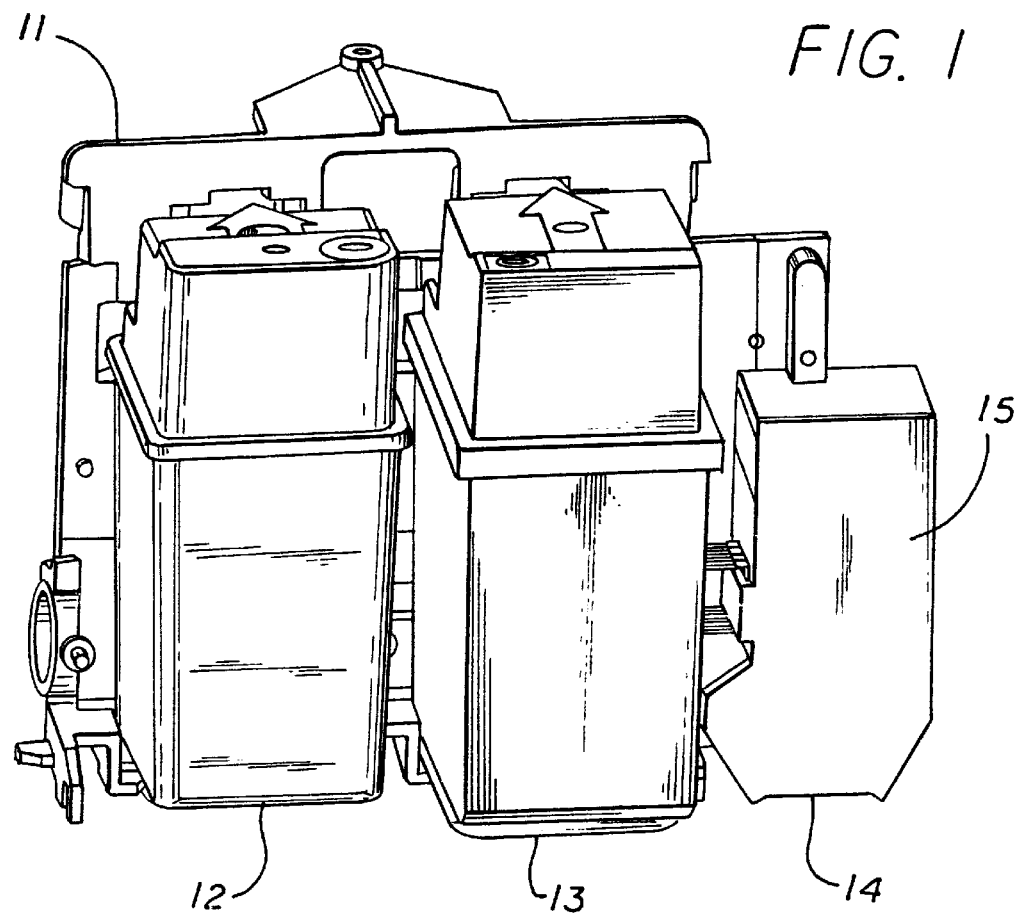
FIG. 1 is a front elevation of a preferred embodiment of the invention that includes a carriage holding two pens, and also holding a sensor assembly with its cover in place.

The present invention is a scanning system generally intended for use in a scanner; however, it may also be used in a printer, copier, FAX machine, or other related device. As shown in FIG. 1, preferred embodiments of the invention may be advantageously incorporated into a device having a carriage 11 such as typically associated with an automatic printer, as for instance a thermal-inkjet desk-top printer.

This combination is a particularly powerful one, since much of the necessary mechanics, electronics and firmware for scanning are already present in such a printer. Scanning functions therefore can be added at extremely modest direct cost.

The carriage 11 holds a black pen cartridge 12 and a color pen cartridge 13. Also securely mounted to the carriage 11 is a sensor assembly 14, shown with its cover 15 in place.

Figure 2:
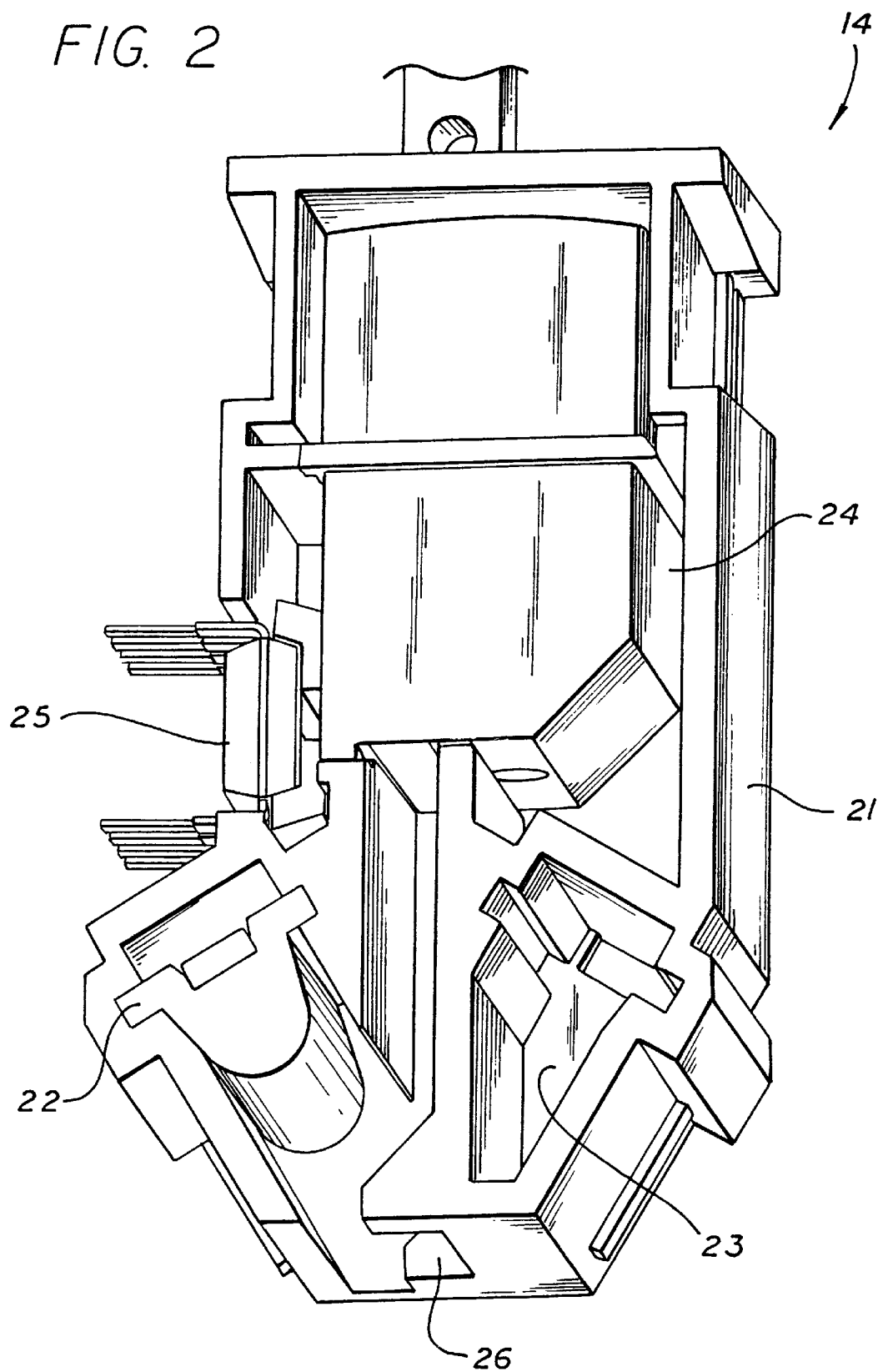
FIG. 2 is a front elevation of the sensor assembly of FIG. 1 with its cover removed.

Internal elements of the sensor assembly 14 include a housing 21 (FIG. 2) with plural bays 23 for holding light-emitting diodes (LEDs) 22. An LED 22 should be installed in each bay 23. The housing 21 also has a channel 26 for passage of incoming light from a document (not shown) below the assembly 14.

Mounted in the housing 21 is an imager 24, shown here in the form of a solid optical block whose surfaces define curved internal mirrors and a planar folding mirror. The solid-block embodiment with a folding mirror, or for short-hand purposes "solid-fold imager" is merely one of several embodiments which can effectively function within the sensor assembly 14. The housing 21 further contains a detector array 25.

Imager 24 is positioned to receive light, through channel 26, from the document being scanned and to direct the light toward the detector array 25. In this embodiment the imager forms, at the detector array 25, an image of document objects located in the imager's field of view. Detector array 25 responds to the light it receives by producing a corresponding array of electrical signals which it forwards to system electronics (not shown) for storage.

The original Offner imager 31 (FIG. 3) does not employ a solid block to define internal mirrors; rather the imager has mirrors formed to receive and redirect light that passes through the air. This original Offner imager will be abbreviated "air imager". The air imager 31 includes converging mirror means 32 and a diverging mirror 33.

Rays 38, 39 from an object point 34 in an object plane 37 are collected by the converging mirror means 32 and directed toward the diverging mirror 33. The diverging mirror 33 in turn redirects the rays 48, 49 back toward the converging mirror means 32, which once again redirects the rays toward an image plane 35 to form an image point 36. Note that the object plane 37 and the image plane 35 are coplanar, making this embodiment of the air imager 31 symmetric.

For optimum imager performance, in this embodiment and other embodiments, it is desirable to position the aperture stop of the imager at the imager's focal point. In this embodiment the diverging mirror 33, i.e. the aperture stop, is located at the focal point midway between converging mirror means 32 and the object plane 37.

Placement of the diverging mirror 33 in this location makes the imager telecentric. This means that principal rays to each image point are closely parallel to the optical axis, so that image magnification and size are insensitive to axial displacement, essentially eliminating distortion.

Telecentricity also inherently provides uniform light collection, independent of object distance off the optical axis. This characteristic results in images with uniform brightness.

FIGS. 4b and 4c depict an air-fold imager 41. Like the air imager 31, the air-fold imager 41 includes converging mirror means 32 and a diverging mirror 33. The distinction between the air imager 31 and the air-fold imager 41 is the addition of a planar folding mirror 42. The function of the folding mirror 42 is to fold the optical path away from the document 43 toward the detector array 25.

Figure 5:
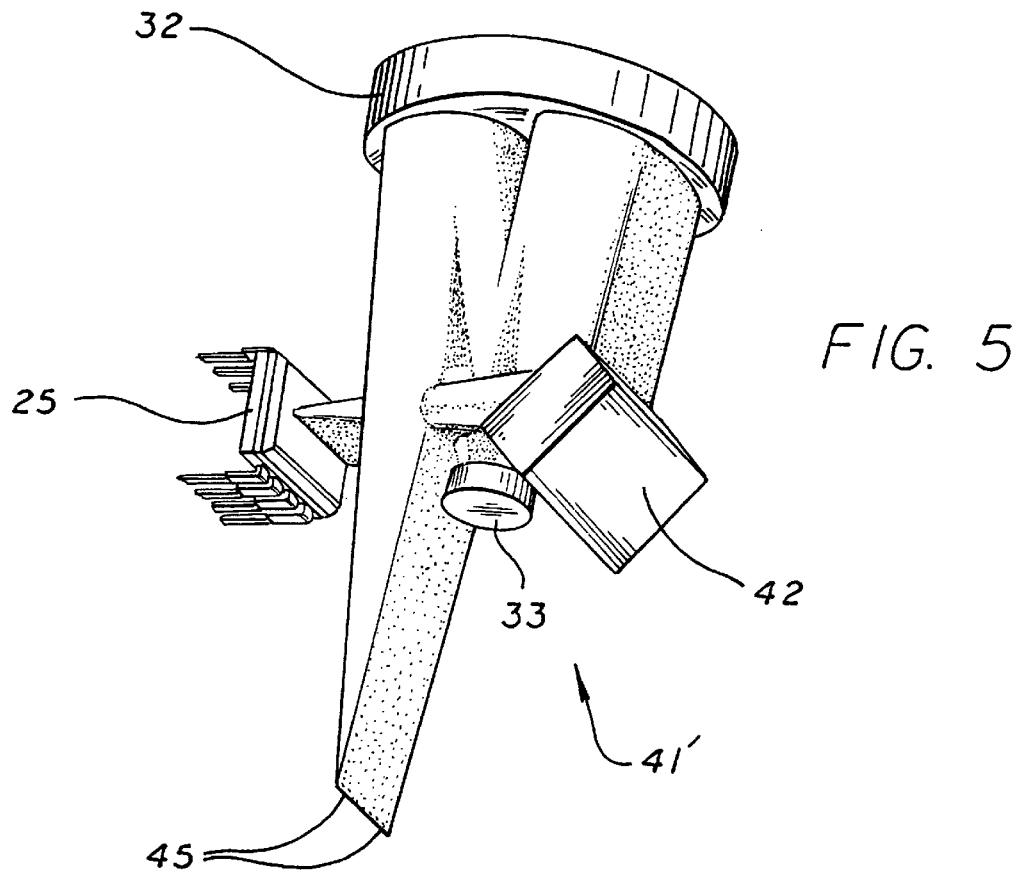
FIG. 5 is a three-dimensional representation of light flow through embodiments similar to the ones shown in FIGS. 4b and 4c.

The folding of the optical path is better appreciated upon viewing FIG. 5, which depicts, three dimensionally, the reflection of light through the air-fold imager 41'. The path is identical to that of the air-imager 41 except that the folding mirror 42 rotates the exit beam ninety degrees. From FIG. 5 it is apparent that the converging mirror means 32 may be sliced, e.g. fore-and-aft parallel to a diameter, into two mirrors without disturbing the flow of light. The converging mirror means 32 may be further sectioned, if desired, in other ways with moderate light loss. Accordingly, converging mirror means 32 may be one mirror or plural mirrors.

While not necessary for imager functionality, the folding mirror 42 is beneficial from a mechanical design perspective because it directs the light away from the document 43. As can be seen in FIGS. 4b and 4c, this enables placement of the detector array 25 where the array does not interfere with the document 43, while still providing a symmetrical imager.

FIGS. 4b and 4c further depict two configurations of a scanning system using the air-fold imager 41. It is to be understood that as far as these two configurations are concerned, any one of various embodiments of the imager may be substituted for the air-fold imager 41. The distinction between the configurations lies in the orientation of the air-fold imager 41 relative to the document 43, and more particularly to the instantaneous field of view (IFOV) 45.

In FIG. 4a, document 43 shows a swath 44, one of a series of such swaths arranged along the length of the paper. Contained within each swath 44, is an IFOV 45, which is typically a one pixel column of the swath 44. The IFOV 45 is the portion of the swath 44 that is being imaged at a given instant.

FIGS. 4a and 4b considered together illustrate a first configuration: the IFOV 45 lies within the plane of symmetry of the air-fold imager 41. As shown, however, all object points are at a considerable distance off the system axis 46 of the air-fold imager 41. Even points at the bottom of the IFOV 45 are above, though close to, the system axis 46. This distance increases greatly for points farther up the IFOV. This off-system-axis distance degrades imaging performance (particularly for a solid version of the imager as discussed below). The imager of FIG. 4b is drawn in the same orientation as the imager of FIG. 3.

FIGS. 4a and 4c considered together depict a second configuration. In this preferred configuration, the IFOV 45 runs in and out of the plane of the paper. It is orthogonal to the plane of symmetry of the air-fold imager. All object points in the IFOV 45 are more nearly equidistant from the imaging system axis 46'. This maintains best available imaging. The imager in FIG. 4c is identical to that of FIG. 4b, but now can be seen in the same orientation as the imager in FIG. 2.

Figure 6A:
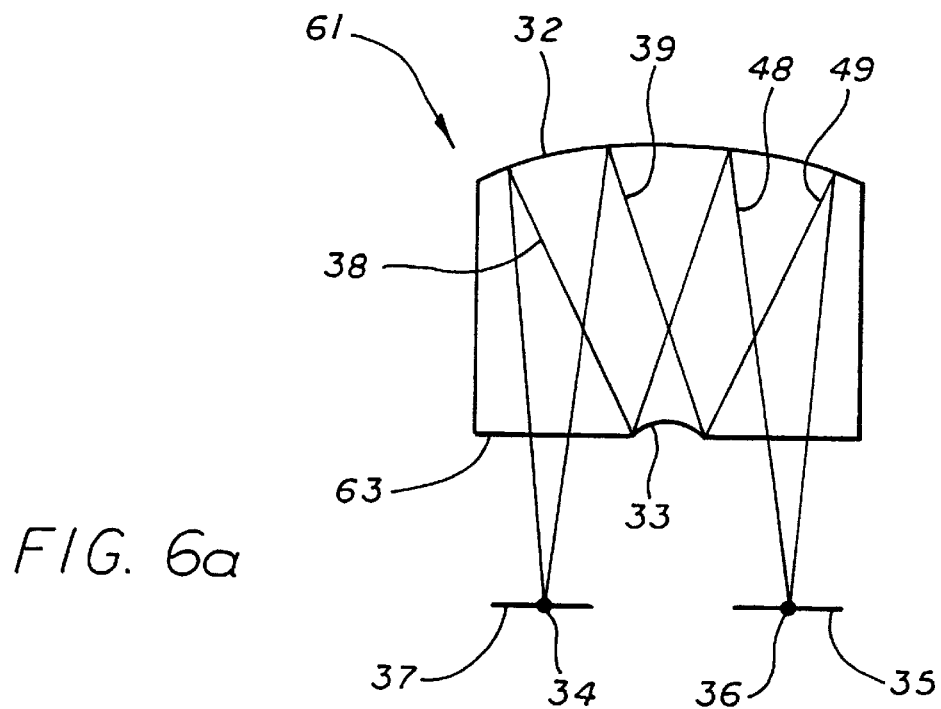
FIGS. 6a and 6b are schematic diagrams, in longitudinal section in a system plane of symmetry, showing imaging optical paths inside a solid block of material, usable in the FIGS. 1 and 2 embodiment—the imager in FIG. 6a being unfolded, and that in FIG. 6b being folded.
Figure 6B:
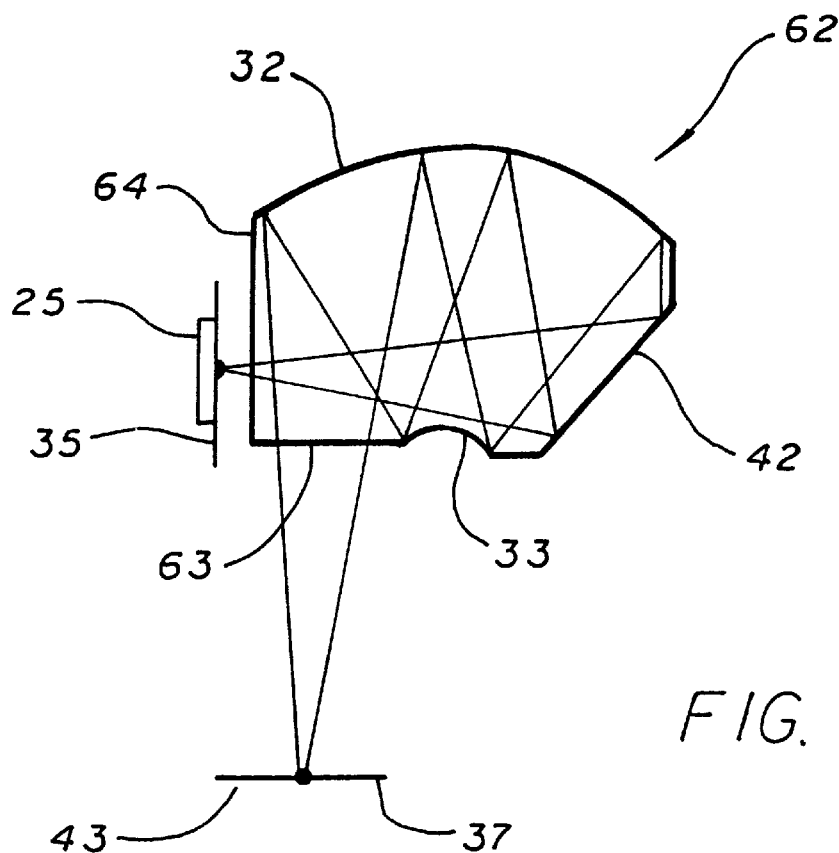

FIG. 6a shows a solid imager 61 while FIG. 6b shows a solid-fold imager 62. Each solid imager 61, 62 is made of solid optical material that forms internal converging mirror means 32 and diverging mirror 33. In the solid-fold imager 62, the addition of an interior folding mirror 42 redirects the light. These solid imagers 61, 62 share features of the previously discussed air imager counter-parts.

Figure 7:
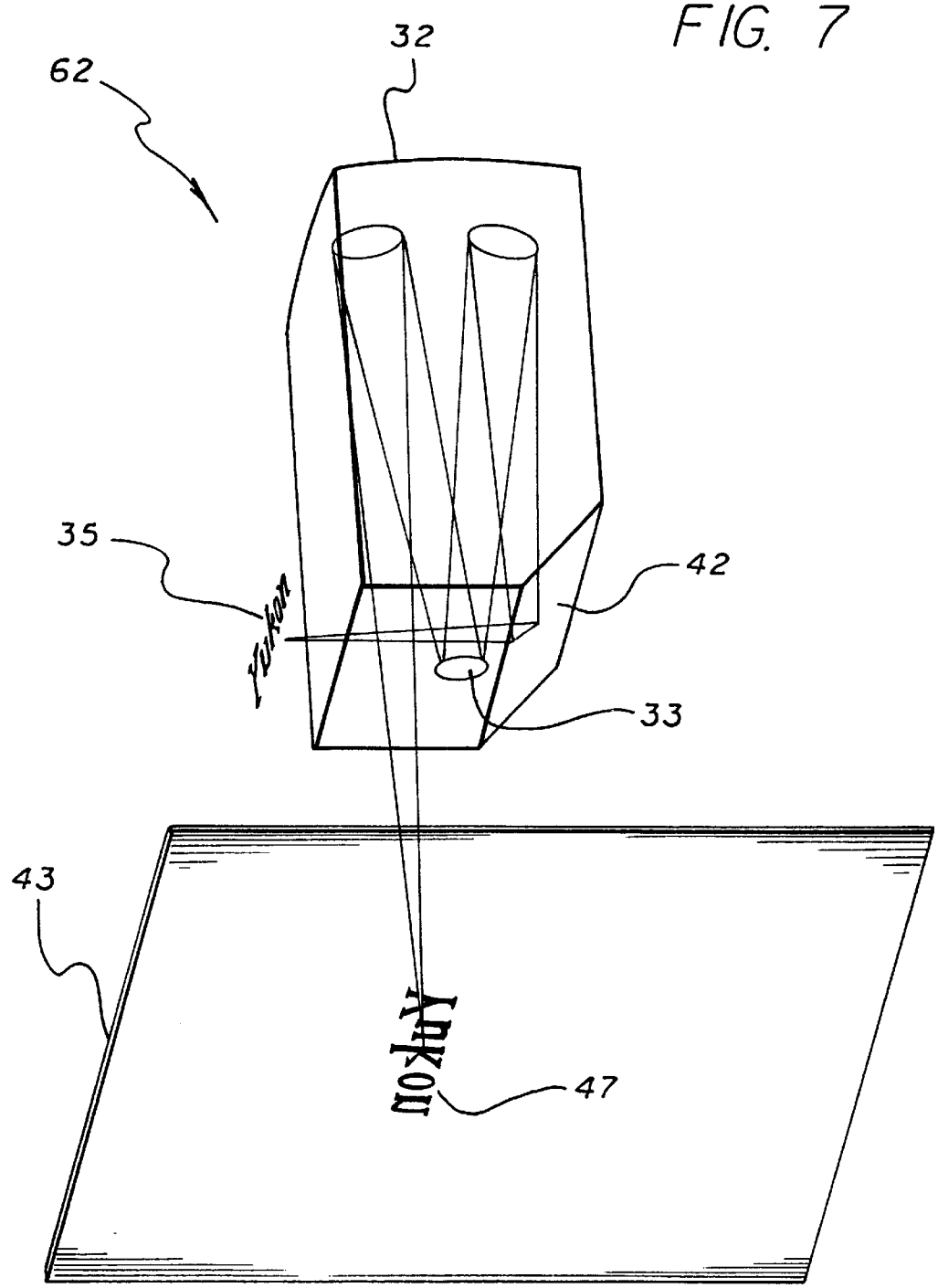
FIG. 7 is a three dimensional representation of light flow through the imager shown in FIG. 6b.

FIG. 7 is a three dimensional rendering of a light path through a solid-fold imager 62. As the drawing suggests, the converging mirror means 32 may be split across the middle without disturbing the flow of light.

An advantage of solid imagers 61, 62 is the assurance of stable axial alignment of the converging mirror means 32 and the diverging mirror 33 through precision mold fabrication. Through mold fabrication the mechanical alignment problems associated with multiple mirror systems are avoided.

The solid imager, however, is more susceptible to off-optical-axis image degradation, particularly due to chromatic aberration—although this can be largely corrected by diffraction as described later in this document. Hence the second configuration of FIG. 4c may be particularly desirable for solid imagers.

Advantages of air imagers over solid imagers also include reduced material (there is no solid optical material between the mirrors) and consequently decreased mold cycle time—both resulting in lower cost. The air imager and solid imager are equally effective. The preferred embodiment at present is the solid imager; however, the air imager is being considered for future use.

It should be noted that symmetry, while desirable, is not absolutely necessary. To keep the sensor assembly housing 21 and thus the overall product enclosure as narrow as possible, it is desirable to keep the detector array 25 as close as possible to the system axis. In the solid-fold equivalent of the FIG. 4c orientation the exit surface 64 protrudes at the left side of the sensor assembly 14, and I prefer to narrow the optical block to reduce this width.

Another desirable adjustment to the optical path is increasing the distance between the object plane 37 and the front surface 63. A principal benefit of moving the object plane 37 farther from the front surface 63 is better object illumination. Light can be aimed at the document from farther back—resulting in more uniform illumination.

As an example of such adjustments, the object plane 37—originally at a distance of approximately 13 mm from the front surface 63—was moved to a distance of approximately 22 mm. The image plane 35, while approximately 13 mm from the front surface 63, was placed roughly 2 mm from the top surface 64.

Interestingly the long object path in principle can be exploited to eliminate the folding mirror 42 if desired. With clearance of more than 2 cm, the detector array 25 could be placed between the imager and the document. Suitable protection of the detector array 25 should be provided, or the document path curved to add additional clearance.

An important feature of all embodiments of the imager is the ability to produce images with roughly uniform resolution regardless of object displacement along the optical axis of the imager. In the scanning context this type of displacement is usually caused by a wrinkled or misfed document.

Nearly constant resolution is obtained by purposely introducing an aspheric element into an imager that is otherwise free of spherical aberration. FIGS. 8 and 10 show rays converging at a common point near the focal plane 81. This type of longitudinal ray pattern occurs when the system is free of spherical aberration.

FIG. 10 depicts a series of ray-scatter patterns at various points along the optical axis between the first extreme 82 of the depth of field and the second extreme 83. It is shown that the patterns vary in size, with the smallest circle 84 occurring at (or defining) the nominal focal plane 81 of the imager.

FIGS. 9 and 11 (corresponding to FIGS. 8 and 10 respectively) illustrate like rays in an optical system having slight spherical aberration. The result is a group of rays which maintain a slight scatter throughout the nominal focal region.

As illustrated in FIG. 11, spherical aberration, introduced into the imager through the addition of an aspheric element, causes the image to be relatively blurred in regions where it would otherwise be in sharper focus. This blurring effect, in combination with the conventional defocus effect of FIGS. 8 and 10, results in an image with nearly constant resolution along the imager's depth of field, from first extreme 82' to second extreme 83'.

Comparing FIGS. 10 and 11, the addition of an aspheric element has little effect on the images near the extremes 82, 83, 82', 83' of the depth of field—the blur is only slightly wider. Near the focal planes 81, 81', however, the difference between the images is apparent, with the aspheric element causing the image to be scattered, significantly more so than the image without spherical aberration. The result is more-nearly uniform resolution within the depth of field.

Some sacrifice in fineness of resolution at the nominal focus accompanies this improvement in uniformity, as will be evident from the illustrations. An imager of this type, however, inherently has extraordinarily fine resolution; hence some deliberate degradation is acceptable for this purpose.

The aspheric element is preferably introduced at the aperture stop of the imager; this positioning ensures that light from all points in the object will be treated consistently. The result, in particular, is that the above-described axial elongation of the focal point or circle—to, in essence, nearly a focal cylinder—is reasonably uniform for off-axis, on-axis and moderate skew rays. Otherwise some residual banding, seen as periodic blur variation, could remain due to interaction between axial dependence of resolution and position of object details within the field of view.

For those skilled in the art, an aspheric diverging mirror 33 is readily designed using a ray tracing program such as CodeV (from Optical Research Associates) or Zemax (from Focus Software), in the following manner.

The worst-case focus within tolerance is determined for a spherical diverging mirror. The marginal transverse ray aberration is then calculated for the worst-case-focus situation. The conic constant for the diverging mirror surface is then chosen so that the difference between the marginal transverse ray aberration and the largest zonal transverse ray aberration is approximately one-half the previously calculated defocused aberration of the spherical system.

The curvature and conic constant are then optimized using the ray tracing program. Higher order terms of aspheric surface figures can be used in addition to the conic constant. The imager mold, from which solid imagers will be cast, is machine formed to include the aspheric diverging mirror 33 characteristics, as determined by the software.

Although the previous discussion of an aspheric element centered around its use in the solid-fold imager, this feature is equally applicable to all imager embodiments disclosed herein.

The use of a solid optical material in the imager introduces slight spectral dispersion, i.e. slight chromatic aberration, into the imager. The dispersion occurs as light rays enter and leave the solid optical material at its planar surfaces 63, 64. If left uncorrected this effect will result in a blurred image.

Figure 6C:
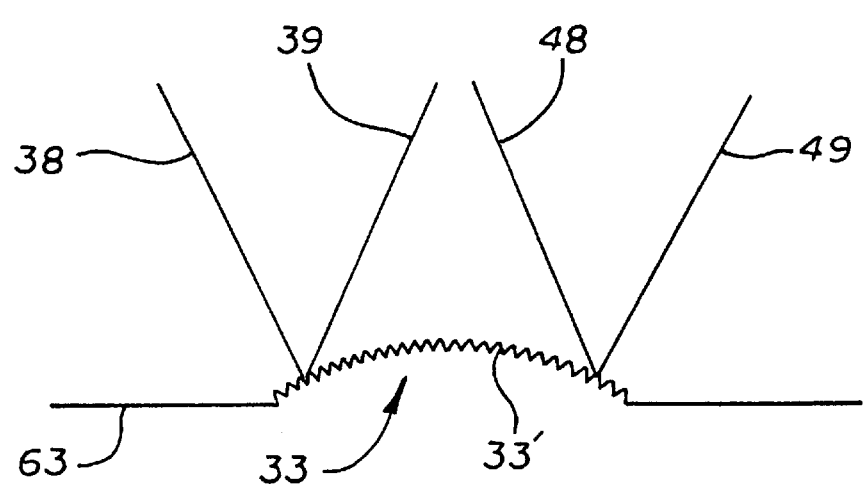
FIG. 6c shows a diffraction pattern carried by the imagers of FIGS. 6a and 6b.

To compensate for this refractive effect it is desirable that the imager carry a diffraction pattern 33', as illustrated in FIG. 6c. The diffraction pattern 33' generates dispersion that is equal and opposite to the refractive dispersion occurring at the air/solid interfaces—thereby canceling the refractive dispersion.

It is preferable to introduce the diffraction pattern 33' at the aperture stop of the imager. For example, in the imager of FIG. 6c the diffraction pattern 33' is carried by diverging mirror 33. A model of the diffraction pattern 33' is determined with the aid of a ray tracing program, such as those previously mentioned.

The diffraction pattern 33' will change the diverging power at the nominal wavelength of the diverging mirror 33. As a result, the curvature of the diverging mirror 33 must be altered so the total diverging power of the diffractive diverging mirror remains the same as that for a nondiffractive diverging mirror.

Like the previously discussed aspheric element, the diffraction pattern 33' and accompanying surface curvature modification are introduced into the imager during fabrication. Through numerically controlled machining processes the diffraction pattern 33' is diamond tooled into a mold, preferably made of nickel-coated stainless steel, from which numerous imagers are to be cast.

FIG. 12 shows detail views of a solid-fold imager 62. The solid-fold imager 62 is made of optical quality acrylic which is formed to define the converging mirror 32 in the top face; diverging mirror 33 and object window 132 in the bottom, entry face 63; image window 131 in the left face, exit face 64; right side face 121, front face 122, rear face 123, and folding mirror 42 bridging the right side and bottom faces 121, 63. Except for the converging and diverging mirrors 32, 33, all surfaces are planar.

The exit window 131 in the left face 64 passes to the detector array the light received from the folding mirror 42. To reduce stray light, the top surface 64 is blackened, except for the detector array window 131.

To reduce stray light, the front surface 63 is blackened except for the object window 132; and the left side surface 122, right side surface 123, and bottom surface 121 are also blackened.

The diverging mirror 33 and converging mirror 32 are mirror coated for ninety-three percent minimum internal reflection across the visible spectrum. After application of the mirror coatings the backs of the coatings may be blackened. The angle formed at the intersection of front surface 63 and folding mirror 42 is forty-five degrees.

Other specifications of the solid-fold imager 62 as explained above, include these approximate values:

| MILLI-METERS | DIMENSION |
| --- | --- |
| 6.0 | distance from centerline 141 to bottom edge of detector window 131 |
| 6.0 | distance from centerline 141 to top edge of detector window 131 |
| 17.8 | distance from apex of converging mirror 32 to remote edge of detector window 131 |
| 16.2 | distance from apex of converging mirror 32 to near edge of detector window 131 |
| 7.9 | distance from diverging mirror horizontal centerline 142 to top of object window 132 |
| 4.1 | distance from diverging mirror horizontal centerline 142 to bottom of object window 132 |
| 2.89 | distance from diverging mirror horizontal centerline 142 to top of folding mirror 42 |
| 10.00 | distance from diverging mirror vertical centerline 143 to left side 122 |
| 20.00 | distance from left side 122 to right side 123 |
| 4.4 | diameter of diverging mirror 33 |
| 40.45 | radius of curvature of converging mirror 32 |
| 20.12 | distance from apex of converging mirror 32 to front surface 124 |
| 12.00 | distance from apex of converging mirror 32 to remote edge of bottom surface 121 |
| 22.00 | distance from top surface 64 to bottom surface 121 |
| 21.36 | distance from front surface 124 to the nominal document plane 133 |
| 21.47 | radius of curvature of diverging mirror 33. |

For imagers disclosed in this document, the relationship between the converging mirror means 32 and the diverging mirror 33, and the relationship between the imager and the object plane 37 and the image plane 35, may be generalized as follows.

Given the distance m between the converging mirror means 32 and the diverging mirror 33, the converging mirror means 32 have a radius of curvature roughly equal to 2m. The diverging mirror 33 has a radius of curvature roughly equal to m.

Figure 3:
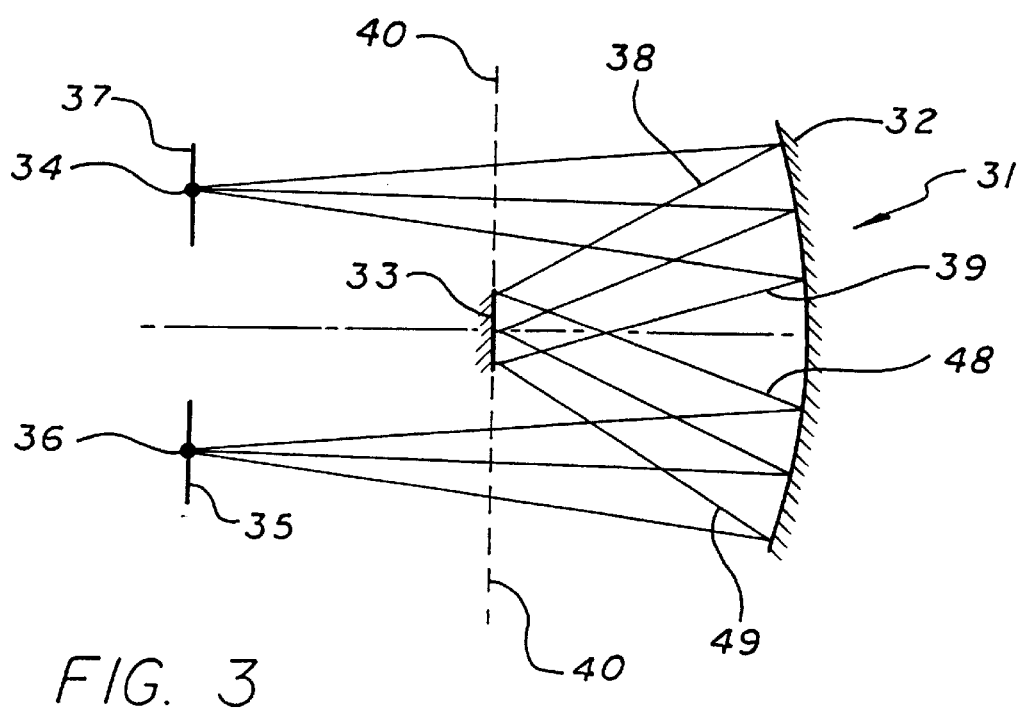
FIG. 3 is a diagram, in longitudinal section in a system plane of symmetry—after Kingsdale, *Lens Design Fundamentals* (1978)—showing very schematically an imaging optical train attributed to A. Offner.

Referring to FIG. 3, for the air imager 31, the distance d from the object plane 35 to the nominal front plane 40 and the distance s from the nominal front plane 40 to the image plane 37, satisfy the relation:

$d+s=2m.$

Referring to FIG. 6a, for the solid imager 61, d is the distance from the object plane 35 to the front surface 63 and s is the distance from the front surface 63 to the image plane 37. Where n is the index of refraction of the optical material, the distances d and s roughly satisfy the relation:

$d+s=2m/n.$

For fold imagers 41, 62, the distances and radii of curvature are calculated as for unfolded imagers 31, 61 respectively, with the fold being added afterward.

The distances and radii of curvature given above are only applicable for a very rough first-order design. The parameters are subsequently optimized for higher-order image quality using an optimizing ray-tracing software program, such as those previously mentioned.

The above disclosure is intended as merely exemplary, and not to limit the scope of the invention—which is to be determined by reference to the appended claims.

What is claimed is:

1. A copier or FAX-machine system for scanning and reproducing a document that is not forcibly flattened, said system comprising:

means for illuminating the document;

a detector array for receiving light and responding to the light by producing a corresponding array of electrical signals;

means for applying the electrical signals to form a copy of the document within the system or by FAX transmission; and a telecentric imager for receiving light reflected by the document and directing the light toward the detector array, said imager being telecentric in at least an input stage that receives light from the document;

wherein the imager forms an image of the document at the detector array that is substantially focused even though the document is not forcibly flattened.

2. A system for scanning a document, said system having an optical axis, and said document being subject to axial displacement; said system comprising:

means for illuminating the document;

a detector array for receiving light and responding to the light by producing a corresponding array of electrical signals; and an imager for receiving light from the document and directing the light toward the detector array;

said imager comprising an aspheric element for introducing spherical aberration to reduce variation of resolution as a function of said axial displacement.

3. The system of claim 2, wherein:

the aspheric element is at an aperture stop.

4. The system of claim 2, wherein:

the imager is telecentric.

5. The system of claim 2, wherein:

the imager further comprises plural surfaces in optical series; and a diffraction pattern, carried by one or more of the surfaces, for correcting spectral dispersion caused by one of the surfaces.

6. The system of claim 2, wherein:

the imager further comprises plural surfaces in optical series;

a diffraction pattern, carried by one or more of the surfaces, for correcting spectral dispersion caused by one of the surfaces; and the imager is telecentric.

7. A system for scanning a document, said system comprising:

means for illuminating the document;

a detector array for receiving light and responding to the light by producing a corresponding array of electrical signals;

an imager, having plural surfaces in optical series, for receiving light from the document and directing the light toward the detector array; and a diffraction pattern, carried by one or more of the surfaces, for correcting spectral dispersion caused by one of the surfaces.

8. The system of claim 7, wherein:

the imager is telecentric.

9. A system for scanning a document, said system comprising:

means for illuminating the document;

a detector array for receiving light and responding to the light by producing a corresponding array of electrical signals;

a reflecting imager having reflective imaging surfaces with optical power for receiving light reflected from the document and directing the light toward the detector array; and means for performing the scanning action by relative movement of the imager and the document.

10. The system of claim 9, wherein:

the reflecting imager comprises plural mirrors in optical series.

11. The system of claim 9, wherein:

the reflecting imager comprises converging mirror means and a diverging mirror, the diverging mirror positioned to receive light from the converging mirror means and reflect the light toward the converging mirror means.

12. The system of claim 11, having an optical path, and wherein:

the reflecting imager further comprises a third mirror positioned in optical series with the converging mirror means to fold the optical path.

13. The system of claim 9, wherein:

the reflecting imager comprises a solid optical material having at least one internal reflective surface that is one of said reflective imaging surfaces with optical power, for forming an image of the illuminated document at the detector array.

14. The system of claim 9, wherein:

the reflecting imager comprises a solid optical material having plural internal reflective surfaces in optical series.

15. The system of claim 9, wherein:

the reflecting imager comprises a solid optical material defining internal converging mirror means and an internal diverging mirror, the diverging mirror positioned to receive light from the converging mirror means and reflect the light toward the converging mirror means.

16. The system of claim 15, having an optical path, and wherein:

the solid optical material further defines a third internal mirror in optical series with the converging mirror means to fold the optical path.

17. The system of claim 15, wherein:

the optical axis of the diverging mirror is aligned with the optical axis of the converging mirror means.

18. The system of claim 15, wherein:

the diverging mirror is aspheric.

19. The system of claim 15, wherein:

the diverging mirror carries a diffraction pattern.

20. The system of claim 15, wherein:

the diverging mirror is aspheric and carries a diffraction pattern.

21. The system of claim 9, wherein the performing means comprise:

means for translating the detector array and imager together across the document to obtain a signal array representing a swath of the document.

22. A system for scanning a document, said system comprising:

means for illuminating the document;
a detector array for receiving light and responding to the light by producing a corresponding array of electrical signals;
an imager comprising a solid optical material defining internal converging mirror means and an internal diverging mirror;
a carriage for translating the detector array and imager together across the document to obtain a signal array representing a swath of the document;
wherein the diverging mirror is aspheric; and
the diverging mirror is positioned to receive light from the converging mirror means and reflect the light toward the converging mirror means.

23. The system of claim 22, wherein:

the solid optical material further defines a third internal mirror positioned to receive light from the converging mirror and fold the light toward the detector array.

24. The system of claim 22, wherein:

the carriage also translates the illuminating means; and
the diverging mirror carries a diffraction pattern.

25. A document-scanning system, comprising:

a detector array responsive to light for producing an electrical signal indicative of indicia disposed on an illuminated document;
a single optical element having a plurality of surfaces for helping to define an optical path extending between at least an object window and an exit window, said object window and said exit window both being disposed at certain different individual ones of said plurality of surfaces;
said plurality of surfaces including:
  a single converging mirror surface for collecting light traveling along a portion of said optical path from an object plane and object point to said object window end for redirecting the collected light along another portion of said optical path;
  a folding mirror surface for redirecting the collected light traveling along yet another portion of said optical path toward an image plane and image point disposed at said detector array; and
  a single diverging mirror surface for collecting the light traveling along said another portion of said optical path and for redirecting the collected light to said folding mirror surface via said single converging mirror surface.

26. A document-scanning system according to claim 25, wherein:

said single optical element is a single block of optical material.

27. A document-scanning system according to claim 26, wherein:

said single block of optical material has planar and nonplanar surfaces.

28. A document-scanning system according to claim 27, wherein:

said object window and said exit window are disposed in different ones of said planar surfaces.

29. A document-scanning system according to claim 28, wherein:

said planar and nonplanar surfaces are coated with a dark material for helping to substantially prevent light from entering and escaping from the single optical element except via said object window and said exit window respectively.

30. A document-scanning system according to claim 25, wherein:

said diverging mirror surface is located at a focal point midway between said converging mirror surface and the object plane for substantially eliminating image distortion at said detector array.

31. A document-scanning system according to claim 30, wherein:

said object plane and said image plane are coplanar to provide a symmetrical image at said detector array.

32. A printer having a carriage mounted for rectilinear movement for facilitating the scanning of an arbitrary document, not necessarily produced by the same printer, comprising:

a housing mounted to the carriage for holding a plurality of illuminating devices to illuminate the document with light;
a single-element imager mounted in said housing for directing light reflecting from the document along a desired optical path to facilitate document scanning for reproduction purposes; and
a detector array mounted to the carriage in said desired optical path for receiving light from said single-element imager to produce an electrical signal indicative of indicia disposed on the document illuminated with light.

33. A printer according to claim 32, wherein:

said single-element imager is a solid optical block having a plurality of surfaces, an individual one of said plurality of surfaces including an object window and another individual one of said plurality of surfaces including an exit window to facilitate the passing of light through the single-element imager and toward said detector array.

34. A printer according to claim 33, wherein:

said plurality of surfaces includes at least one curved surface and at least one planar surface for defining different types of mirror arrangements.

35. A printer according to claim 33, wherein:

said plurality of surfaces helps define an optical path extending between at least said object window and said exit window.

36. A printer according to claim 35, wherein said plurality of surfaces includes:

a single converging mirror surface for collecting light traveling along a portion of said optical path from an object plane and object point to said object window and for redirecting the collected light along another portion of said optical path;
a folding mirror surface for redirecting the collected light traveling along yet another portion of said optical path toward an image plane and image point disposed at said detector array; and
a single diverging mirror surface for collecting the light traveling along said another portion of said optical path and for redirecting the collected light to said folding mirror surface via said single converging mirror surface.

37. A printer according to claim 36, wherein:

said single-element imager is a nonair imager.

38. A printer according to claim 37, wherein:

said nonair imager is a telecentric imager.

* * * * *

UNITED STATES PATENT AND TRADEMARK OFFICE
CERTIFICATE OF CORRECTION

| | |
|---|---|
| PATENT NO. | : 6,088,134 |
| DATED | : July 11, 2000 |
| INVENTOR(S) | : Jack H. Schmidt et al. |

It is certified that error appears in the above-identified patent and that said Letters Patent is hereby corrected as shown below:

<u>Claim 25,</u> (New; to follow claim 1),
Insert -- The copier or FAX-machine system of claim 1, further comprising:
means for alternatively applying the electrical signals to form a data file, representing the document image, for storage. --

Signed and Sealed this

Twenty-third Day of October, 2001

Attest:

*Attesting Officer*

NICHOLAS P. GODICI
*Acting Director of the United States Patent and Trademark Office*